J. V. WASHBURNE.
SPRING ROLLER.
APPLICATION FILED JAN. 19, 1916.

1,278,404.

Patented Sept. 10, 1918.

INVENTOR
James V. Washburne.
BY
Parsons & Bodell
ATTORNEYS

UNITED STATES PATENT OFFICE.

JAMES V. WASHBURNE, OF FULTON, NEW YORK.

SPRING-ROLLER.

1,278,404.   Specification of Letters Patent.   Patented Sept. 10, 1918.

Application filed January 19, 1916. Serial No. 72,972.

*To all whom it may concern:*

Be it known that I, JAMES V. WASHBURNE, a citizen of the United States, and a resident of Fulton, in the county of Oswego, and State of New York, have invented a certain new and useful Spring-Roller, of which the following is a specification.

This invention has for its object a spring roller of the type usually employed as a shade roller such as shown in my Patent No. 1,053,460 issued February 18, 1913; and the invention consists in the novel combinations and constructions hereinafter set forth and claimed.

In describing this invention, reference is had to the accompanying drawings in which like characters designate corresponding parts in all the views.

Figure 1:
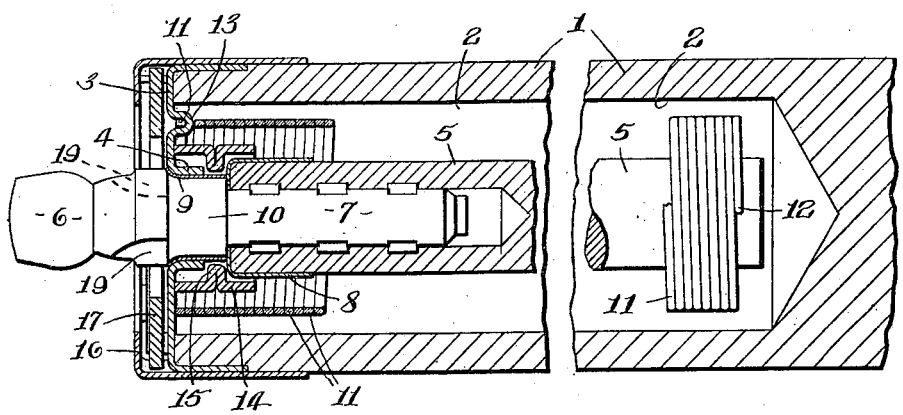
Figure 1 is a fragmentary longitudinal sectional view on an enlarged scale, of a spring roller embodying my invention.
Figure 2:
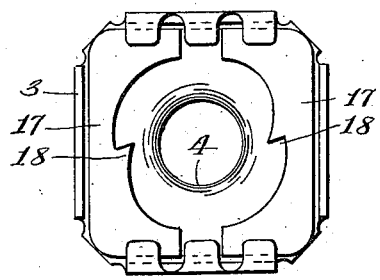
Fig. 2 is a face view of the detached pawl or catch carrying plate and the pawls or catches.

This roller comprises generally, a tubular body or body having an axial bore or passage opening through one end thereof, a head or disk closing the open end of the passage and formed with a central bearing or hub, a spindle extending axially of the bore and having an axle journaled in the bearing of the disk, a coiled spring encircling the spindle and being connected at one end thereto and at its other end to the head or disk and means on which the spring contracts near where it is attached to the head so as not to bind on the spindle, said means being located within the spring and interposed between the spring and the spindle and said bearing. Said means is preferably rotatable relatively to the spindle and also relatively to the head or disk, that is, it is loosely mounted on the spindle or the bearing.

1 designates the body of the spring roller which is usually formed hollow or with an axial bore or passage 2 opening through one end thereof.

3 designates the disk or head suitably secured to the body 1 at the open end of the passage 2, this head 3 being formed with an internal bearing or hub 4.

5 designates the spindle extending axially of the passage 2 and provided with an axle or spear 6 at one end which is journaled in the hub or bearing 4 and which has a shank 7 suitably secured in an axial bore in the spindle 5. The major part of the spindle 5 is generally formed of wood while the axle or spear 6 is formed of metal and the end of the wood part of the spindle adjacent the axle 6 is provided with a metal cap 8. A bushing 9 is located within the bearing 4 which bushing meets the top or end wall of the cap 8. The body or wood part of the spindle 5 is of greater diameter than the axle 6 or the portion 10 thereof journaled in the hub 4 so that the end portion on which the cap 8 is formed is opposed to the end edge of the hub or bearing 4, forming therewith an annular groove.

11 is the coiled spring located in the passage or bore 2 of the body 1 and encircling the spindle 5, this spring being fixed at one end, as at 12, to the spindle 5 and being fixed at its other end to the head or disk 3, it being shown as having its end coil passed through loops or corrugations 13 provided on the inner side of the head or disk 3.

Figure 3:
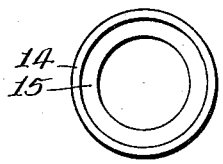
Fig. 3 and 4, are respectively, end and side elevations of the anti-friction sleeve encircling the spindle within the coiled spring.
Figure 4:
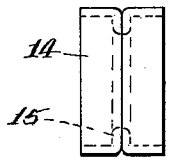

The means for preventing the spring from binding on the spindle or the axle during contraction, as here shown, includes a sleeve 14 rotatably mounted on the hub 4 and the spindle 5 adjacent the disk 3, the spindle and the sleeve having means by which the sleeve is held from endwise movement. As here shown, the sleeve is preferably formed with an internal annular shoulder 15 and this shoulder is located midway between the ends of the sleeve and extends into the groove or channel on the spindle 5 between the end of the hub 4 and the opposing end surface of the spindle 5. As seen in Figs. 1 and 3, this shoulder is preferably formed by providing the sleeve with an internal annular corrugation. This annular shoulder 15 holds the sleeve in position, prevents axial movement thereof, and provides a friction reducing bearing for the same on the spindle or axle.

In operation, when the spring is tensioned and contracts during unwinding of the roller, it contracts on the sleeve 14 which is free to rotate on the spindle 2 during the rotation of the barrel or body 1, so that binding of the spring on any part not rotatable with body of the roller is prevented and also jamming or working of the coils between the hub 4 and the opposite surface of the axle is prevented.

16 designates a cap covering the head 3 which head serves as a catch holding plate as in my patent referred to. 17 are sliding catches or pawls guided in said head or plate 3 and having teeth 18 which coact with notches or teeth 19 provided on the axle as in my patent referred to.

This spring roller is particularly advantageous in that it is provided with a particularly simple and efficient means for preventing binding of the coiled spring on the spindle or axle.

What I claim is:

1. A spring roller comprising a body having an internal axial passage opening through one end thereof, a head closing the open end of the passage and provided with a bearing, a spindle extending axially of the passage having an axle projecting beyond said head and journaled in the bearing thereof, a coiled spring encircling the spindle and connected at one end thereto and at its other end to the said head, and means located within the coil spring and adjacent said head and being mounted to move about the spindle and relatively to the head, substantially as and for the purpose described.

2. A spring roller comprising a body having an internal axial passage opening through one end thereof, a head closing the open end of the passage and provided with a bearing, a spindle extending axially of the passage having an axle projecting beyond said head and journaled in the bearing thereof, a coiled spring encircling the spindle and connected at one end thereto and at its other end to the said head, and a sleeve encircling the spindle adjacent said head and rotatably mounted relatively to the spindle and the head, said sleeve being located within the spring, substantially at and for the purpose specified.

3. A spring roller comprising a body having an internal axial passage opening through one end thereof, a head closing the open end of the passage and provided with a bearing, a spindle extending axially of the passage and having an axle projecting beyond said head and journaled in the bearing thereof, a coiled spring encircling the spindle and connected at one end thereto and at its opposite end to said head, and a sleeve encircling the spindle adjacent said head, the sleeve being located within the spring, the sleeve and contiguous parts having coacting means holding the sleeve from axial movement, the sleeve being rotatably mounted relatively to the head and the spindle, substantially as and for the purpose set forth.

4. A spring roller comprising a body having an internal axial passage opening through one end thereof, a head closing the open end of the passage and being provided with a bearing, a spindle extending axially of the passage and having an axle projecting beyond said head and journaled in the bearing theerof, a coiled spring encircling the spindle and connected at one end thereto and at its opposite end to said head, and a sleeve loosely mounted on the spindle adjacent said head, and being located within the spring, the sleeve being provided with an internal shoulder and the spindle and bearing having annular spaced apart surfaces forming an annular groove for receiving the shoulder, substantially as and for the purpose set forth.

5. A spring roller comprising a body having an internal axial passage opening through one end thereof, a head closing the open end of the passage and provided with a bearing, a spindle extending axially of the passage and having an axle projecting beyond said head and journaled in the bearing thereof, a coiled spring encircling the spindle and connected at one end thereto and at its opposite end to said head, and a sleeve loosely mounted on the spindle adjacent said head, the sleeve being located within the spring, the sleeve being formed with an internal corrugation between the ends thereof forming an internal annular shoulder for bearing on the spindle, substantially as and for the purpose specified.

In testimony whereof, I have hereunto signed my name, at Syracuse, in the county of Onondaga, and State of New York, this 21st day of December, 1915.

JAMES V. WASHBURNE.